(12) United States Patent
Yang et al.

(10) Patent No.: US 9,572,146 B2
(45) Date of Patent: Feb. 14, 2017

(54) DOWNLINK SIGNAL RECEIVING METHOD AND USER EQUIPMENT, AND DOWNLINK SIGNAL TRANSMITTING METHOD AND BASE STATION

(75) Inventors: Suckchel Yang, Anyang-si (KR); Hanbyul Seo, Anyang-si (KR); Joonkui Ahn, Anyang-si (KR); Dongyoun Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 601 days.

(21) Appl. No.: 14/233,093

(22) PCT Filed: Jul. 13, 2012

(86) PCT No.: PCT/KR2012/005632
§ 371 (c)(1),
(2), (4) Date: Jan. 15, 2014

(87) PCT Pub. No.: WO2013/012221
PCT Pub. Date: Jan. 24, 2013

(65) Prior Publication Data
US 2014/0161084 A1    Jun. 12, 2014

Related U.S. Application Data

(60) Provisional application No. 61/508,069, filed on Jul. 15, 2011.

(51) Int. Cl.
*H04W 4/00* (2009.01)
*H04W 72/04* (2009.01)
(Continued)

(52) U.S. Cl.
CPC .......... *H04W 72/042* (2013.01); *H04L 1/0038* (2013.01); *H04L 1/1822* (2013.01);
(Continued)

(58) Field of Classification Search
CPC ............. H04W 72/042; H04W 72/0413; H04L 1/0038; H04L 1/1822; H04L 1/1854; H04L 1/1896; H04L 1/1812
(Continued)

(56) References Cited

U.S. PATENT DOCUMENTS

2010/0251054 A1* 9/2010 Cai ................. H04L 1/1877
714/748
2010/0260124 A1    10/2010 Noshio et al.
(Continued)

FOREIGN PATENT DOCUMENTS

KR    10-2009-0116220 A    11/2009
KR    10-2010-0053060 A    5/2010
(Continued)

OTHER PUBLICATIONS

WO 2009/058905 A1; Malladi, et al.; International Publication Date: May 7, 2009.*

*Primary Examiner* — Peter Cheng
(74) *Attorney, Agent, or Firm* — Birch, Stewart, Kolasch & Birch, LLP

(57) ABSTRACT

According to the present invention, one or more PDCCH-SFs are set from among subframes in a predetermined duration so as to force user equipment (UE) to perform a PDCCH blind decoding (BD). Information indicating said set PDCCH-SF is provided to the UE from a base station (BS). The UE performs the PDCCH BD only in the PDCCH-SF which is set to the UE itself, and not to all subframes, and performs HARQ process(es) according to the PDCCH BD. The present invention exhibits the advantages of reducing the number of BDs which the UE has to perform and of reducing the implementation complexity of the UE.

12 Claims, 12 Drawing Sheets (a)

(b)

(51) Int. Cl.
*H04L 1/00* (2006.01)
*H04L 1/18* (2006.01)

(52) U.S. Cl.
CPC .......... *H04L 1/1854* (2013.01); *H04L 1/1896* (2013.01); *H04W 72/0413* (2013.01); *H04L 1/1812* (2013.01)

(58) Field of Classification Search
USPC .......................................................... 370/329
See application file for complete search history.

(56) References Cited

U.S. PATENT DOCUMENTS

2010/0302983 A1* 12/2010 McBeath ............. H04L 5/0005
370/311
2010/0322114 A1* 12/2010 Li ........................ H04L 5/0053
370/278
2012/0307759 A1 12/2012 Miki

FOREIGN PATENT DOCUMENTS

| WO | WO 2009/057283 A1 | 5/2009 |
| WO | WO 2009/058905 A2 | 5/2009 |
| WO | WO 2010/129606 A1 | 11/2010 |
| WO | WO 2011/083651 A1 | 7/2011 |

* cited by examiner

DOWNLINK SIGNAL RECEIVING METHOD AND USER EQUIPMENT, AND DOWNLINK SIGNAL TRANSMITTING METHOD AND BASE STATION

CROSS REFERENCE TO RELATED APPLICATIONS

This application is the National Phase of PCT/KR2012/005632 filed on Jul. 13, 2012, which claims priority under 35 U.S.C. 119(e) to U.S. Provisional Application No. 61/508,069 filed on Jul. 15, 2011, all of which are hereby expressly incorporated by reference into the present application.

TECHNICAL FIELD

The present invention relates to a wireless communication system. More particularly, the present invention relates to a method and apparatus for transmitting/receiving a downlink signal and a method and apparatus for transmitting/receiving an uplink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A communication system including high-density nodes may provide a better communication service to the user through cooperation between the nodes.

Due to introduction of new radio communication technology, the number of user equipments (UEs) to which a BS should provide a service in a prescribed resource region increases and the amount of uplink data and uplink control information that the BS should receive from the UEs increases. Since the amount of resources available to the BS for communication with UE(s) is finite, a new method for efficiently transmitting/receiving an uplink/downlink signal using the finite radio resources is needed.

DETAILED DESCRIPTION OF THE INVENTION

Technical Problems

The present invention provides a method and apparatus for efficiently transmitting/receiving a downlink signal.

The present invention also provides a method and apparatus for efficiently transmitting/receiving an uplink signal.

The technical objects that can be achieved through the present invention are not limited to what has been particularly described hereinabove and other technical objects not described herein will be more clearly understood by persons skilled in the art from the following detailed description.

Technical Solutions

According to an aspect of the present invention, provided herein is a method for receiving a downlink signal from a base station by a user equipment in a wireless communication system, including receiving first information and second information from the base station, the first information indicating L subframes (where L is a positive integer) available for transmission of a downlink control signal for the user equipment among a plurality of subframes corresponding to a prescribed duration and the second information indicating a maximum number Np of hybrid automatic repeat request (HARQ) processes (where Np is a positive integer not greater than L) supported for the user equipment; and performing blind decoding for detecting the downlink control signal only in the L subframes indicated by the first information among the plurality of subframes, wherein, if the number of subframes in which the downlink control signal has been detected becomes Np in a subframe group consisting of K consecutive subframes (where K is a positive integer greater than L) starting from a subframe in which the downlink control signal has been detected, the blind decoding is omitted in the remaining subframe(s) in the subframe group.

In another aspect of the present invention, provided herein is a user equipment for receiving a downlink signal from a base station in a wireless communication system, including a radio frequency (RF) unit configured to transmit/receive a signal; and a processor configured to control the RF unit, wherein the processor controls the RF unit to receive first information and second information from the base station, the first information indicating L subframes (where L is a positive integer) available for transmission of a downlink control signal for the user equipment among a plurality of subframes corresponding to a prescribed duration and the second information indicating a maximum number Np of hybrid automatic repeat request (HARQ) processes (where Np is a positive integer not greater than L) supported for the user equipment, and performs blind decoding for detecting the downlink control signal only in the L subframes indicated by the first information among the plurality of subframes, and wherein, if the number of subframes in which the downlink control signal has been detected becomes Np in a subframe group consisting of K consecutive subframes (where K is a positive integer greater than L) starting from a subframe in which the downlink control signal has been detected, the blind decoding is omitted in the remaining subframe(s) in the subframe group.

In each aspect of the present invention, K may be the number of subframes corresponding to an interval between initial transmission of downlink data and retransmission of the downlink data.

In each aspect of the present invention, the first information may include a bitmap consisting of a plurality of bits corresponding one to one to the plurality of subframes corresponding to the prescribed duration or include information indicating a start subframe and a period of the start subframe.

In each aspect of the present invention, if the first information includes the bitmap, a subframe corresponding to a bit set to a first value among the plurality of bits may be a subframe available for transmission of the downlink control signal and a subframe corresponding to a bit set to a second value among the plurality of bits may be a subframe other than the subframe available for transmission of the downlink control signal.

In each aspect of the present invention, a HARQ process may be performed only in the L subframes indicated by the first information among the plurality of subframes.

In each aspect of the present invention, if the user equipment is a prescribed user equipment that is incapable of performing blind decoding in consecutive subframes, information indicating that the user equipment is the prescribed user equipment may be transmitted from the user equipment to the base station.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, complexity of UE implementation can be reduced.

According to the present invention, a reference value of a processing speed required of a UE can be lowered.

According to the present invention, communication between a low-cost/low-end UE and a BS can be facilitated.

According to the present invention, a BS can efficiently perform uplink/downlink scheduling.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
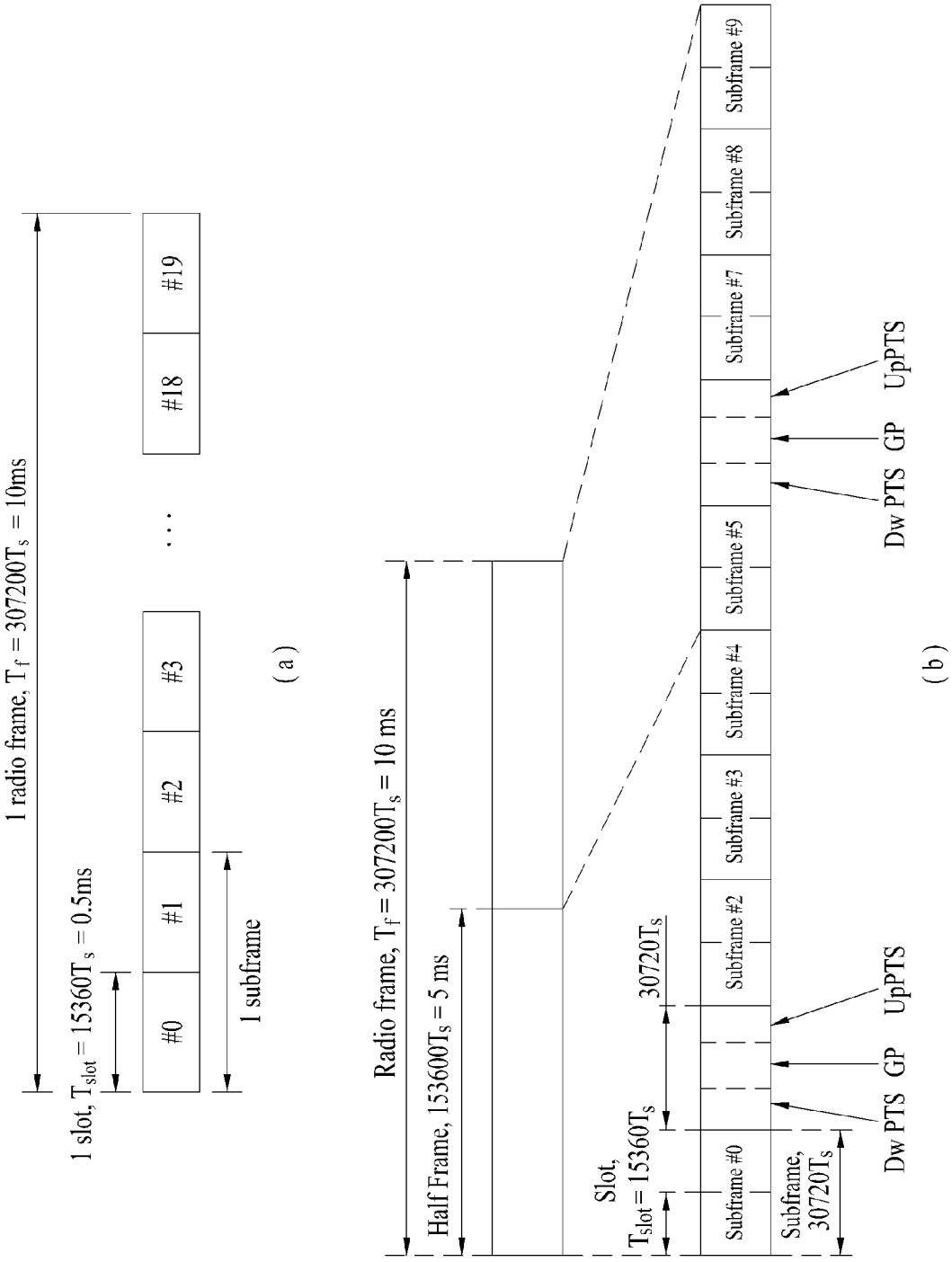
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a base station (BS) generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH), and a physical random access channel (PRACH) refer to a set of time-frequency resources or REs carrying uplink control information (UCI), a set of time-frequency resources or REs carrying uplink data, and a set of time-frequency resources or REs carrying a random access signal, respectively. In the present invention, in particular, a time-frequency resource or RE that is assigned to or belongs to PDCCH/PCFICH/PHICH/PDSCH/PUCCH/PUSCH/PRACH is referred to as a PDCCH/PCFICH/PHICH/PDSCH/PUCCH/PUSCH/PRACH RE or PDCCH/PCFICH/PHICH/PDSCH/PUCCH/PUSCH/PRACH resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a BS is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates a frame structure for frequency division duplex (FDD) used in 3GPP LTE(-A) and FIG. 1(b) illustrates a frame structure for time division duplex (TDD) used in 3GPP LTE(-A).

Referring to FIG. 1, a 3GPP LTE(-A) radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048\cdot15$ kHz). Each subframe is 1 ms long and is further divided into two slots. 20 slots may be sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex mode. In FDD mode for example, since downlink (DL) transmission and uplink (UL) transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Table 1 shows an exemplary UL-DL configurations for subframes in a radio frame in TDD mode.

Figure 2:
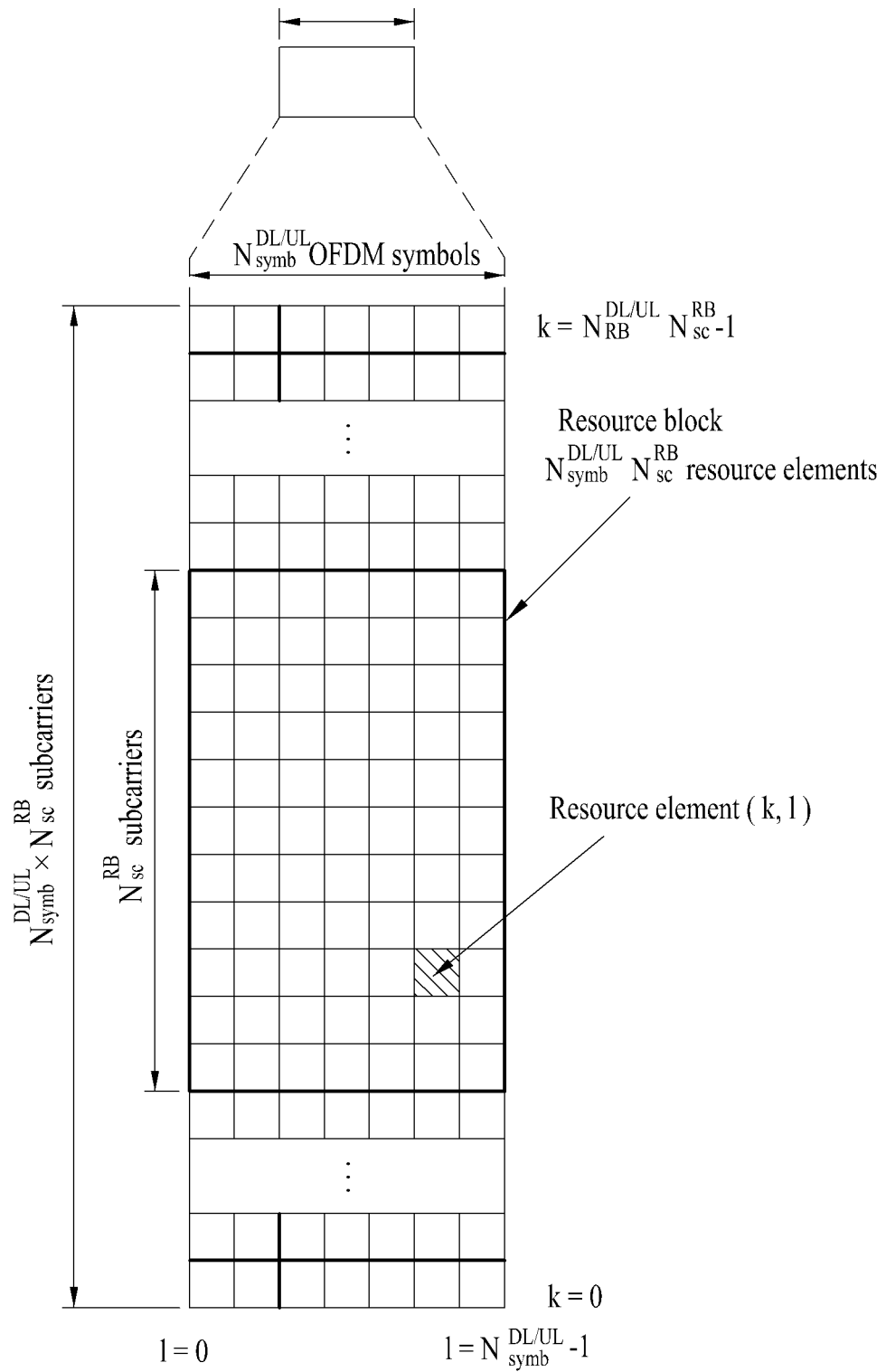
FIG. 2 illustrates the structure of a downlink (DL)/uplink (UL) slot in a wireless communication system.

FIG. 2 illustrates the structure of a DL/UL slot in a wireless communication system. In particular, FIG. 2 illustrates the structure of a resource grid of a 3GPP LTE(-A) system. One resource grid is defined per antenna port.

Referring to FIG. 2, a slot includes a plurality of orthogonal frequency division multiplexing (OFDM) symbols in the time domain and a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/DL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend upon DL transmission bandwidth and UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to a multiple access scheme. The number of OFDM symbols included in one slot may be varied according to channel bandwidth and CP length. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a

TABLE 1

| Uplink-downlink configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. a downlink pilot time slot (DwPTS), a guard period (GP), and an uplink pilot time slot (UpPTS). DwPTS is a time slot reserved for DL transmission and UpPTS is a time slot reserved for UL transmission. Table 2 shows an exemplary special subframe configuration.

different number of OFDM symbols. Referring to FIG. 2, each OFDM symbol includes $N^{DL/UL}_{RB}*N^{RB}_{sc}$ subcarriers in the frequency domain. The subcarrier may be categorized as a data subcarrier for data transmission, a reference signal subcarrier for reference signal transmission, and a null subcarrier for a guard band and a DC component. The null subcarrier for the DC component is unused and is mapped to

TABLE 2

| | | Normal cyclic prefix in downlink | | Extended cyclic prefix in downlink | | |
|---|---|---|---|---|---|---|
| | | \multicolumn{2}{c}{UpPTS} | | \multicolumn{2}{c}{UpPTS} |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | —             | —            | —            |
| 8 | 24144 · $T_s$ |              |              | —             | —            | —            | a carrier frequency $f_0$ in a process of generating an OFDM signal or in a frequency up-conversion process. The carrier frequency is also called center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/DL}_{RB}*N^{RB}_{sc}-1$ in the frequency domain, and l is an index ranging from 0 to $N^{DL/UL}_{symb}-1$ in the time domain.

In one subframe, two RBs respectively located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
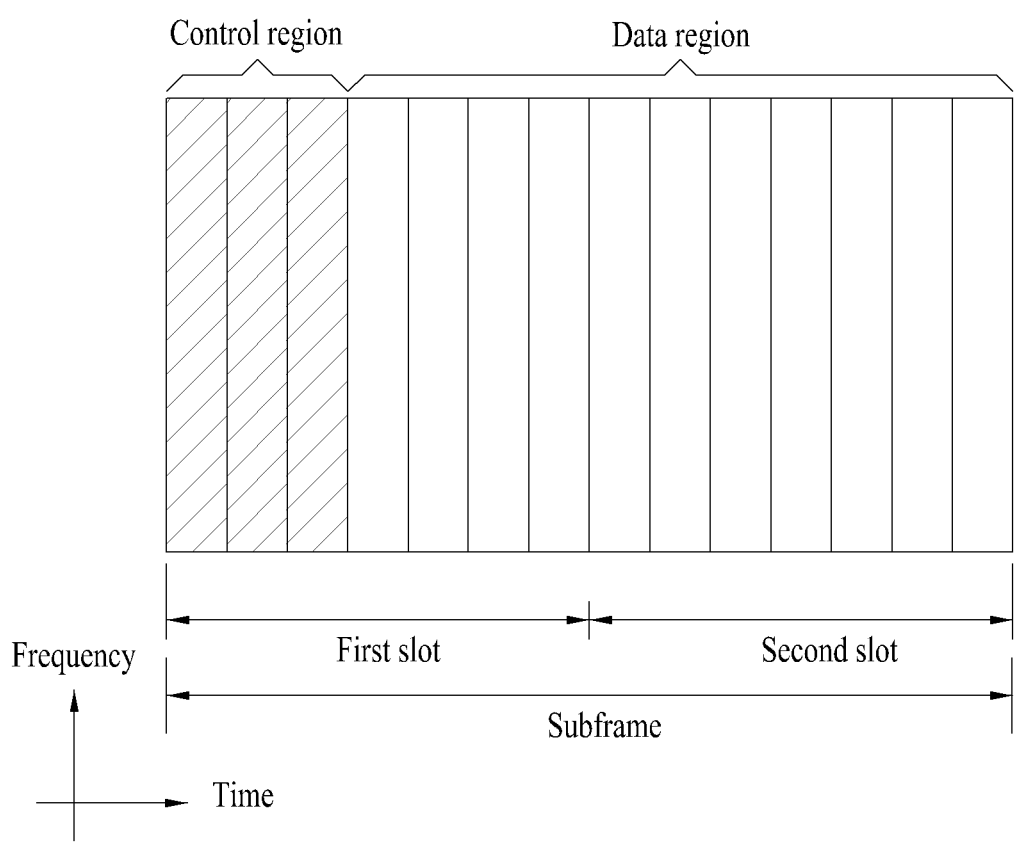
FIG. 3 illustrates the structure of a DL subframe used in a 3GPP LTE(-A) system.

FIG. 3 illustrates the structure of a DL subframe used in a 3GPP LTE(-A) system.

Figure 4:
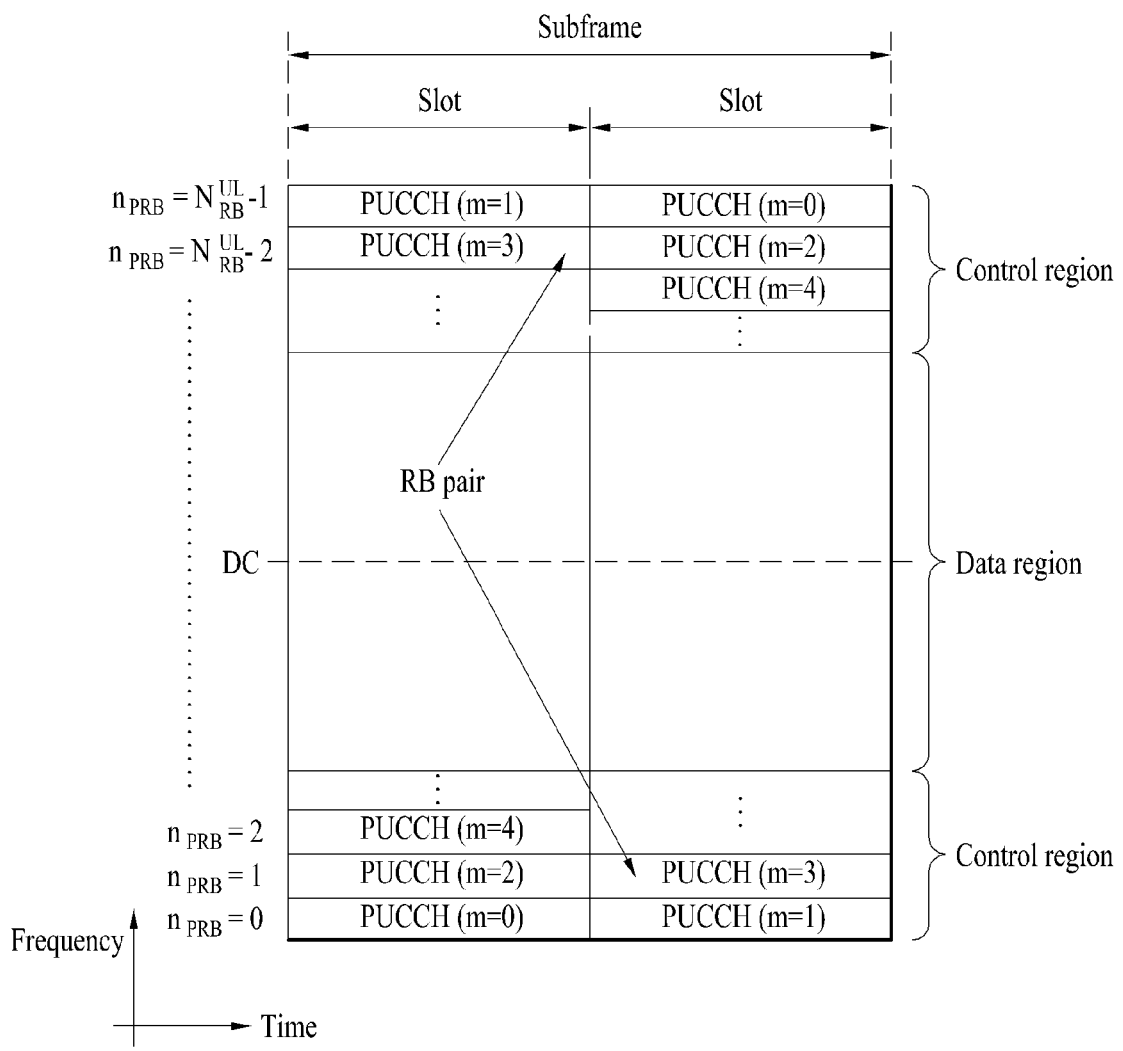
FIG. 4 illustrates the structure of a UL subframe used in a 3GPP LTE(-A) system.

Referring to FIG. 3, a DL subframe is divided into a control region and a data region in the time domain. Referring to FIG. 4, a maximum of 3 (or 4) OFDM symbols located in a front part of a first slot of a subframe correspond to the control region. Hereinafter, a resource region usable for PDCCH transmission in the DL subframe is referred to as a PDCCH region. OFDM symbols other than the OFDM symbol(s) used in the control region correspond to the data region to which a PDSCH is allocated. Hereinafter, a resource region usable for PDSCH transmission in the DL subframe is referred to as a PDSCH region. Examples of a DL control channel used in 3GPP LTE include a PCFICH, a PDCCH, a PHICH, etc. The PCFICH is transmitted in the first OFDM symbol of a subframe and carries information about the number of OFDM symbols used for transmission of a control channel within a subframe. The PHICH carries a hybrid automatic repeat request (HARQ) ACK/NACK signal as a response to UL transmission.

Control transmitted via a PDCCH is referred to as downlink control information (DCI). The DCI includes resource allocation information for a UE or a UE group and other control information. For example, the DCI includes transmission format and resource allocation information of a downlink shared channel (DL-SCH), transmission format and resource allocation information of an uplink shared channel (UL-SCH), paging information on a paging channel (PCH), system information on a DL-SCH, resource allocation information of a higher-layer control message such as a random access response transmitted on a PDSCH, a transmit (Tx) power control command set of individual UEs in a UE group, a Tx power control command, activation indication information of voice over IP (VoIP), etc. The transmission format and resource allocation information of the DL-SCH is referred to as DL scheduling information or a DL grant and the transmission format and resource allocation information of the UL-SCH is referred to as UL scheduling information and a UL grant.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. In a 3GPP LTE system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is referred to as a PDCCH candidate. A set of PDCCH candidates that are to be monitored by the UE is defined as the SS. In the 3GPP LTE(-A) system, SSs for respective DCI formats may have different sizes and a dedicated SS and a common SS are defined. The dedicated SS is a UE-specific SS and is configured for each individual UE. The common SS is configured for a plurality of UEs. One PDCCH candidate corresponds to 1, 2, 4, or 8 CCEs according to a CCE aggregation level. A BS transmits an actual PDCCH (DCI) on an arbitrary PDCCH candidate in an SS and a UE monitors the SS to detect the PDCCH (DCI). Here, monitoring refers to attempting to decode each PDCCH in a corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of a corresponding DCI format in every subframe until a PDCCH having an identifier thereof is received and this process is referred to as blind detection (or blind decoding) (hereinafter, BD).

The BS may transmit data for a UE or UE group in the data region. Data transmitted in the data region is referred to as user data. A PDSCH may be allocated to the data region for user data transmission. A PCH and a DL-SCH are transmitted on the PDSCH. The UE may decode control information received on a PDCCH and thus read data received on the PDSCH. DCI transmitted on one PDCCH may differ in size and usage according to DCI format and differ in size according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors PDCCHs using RNTI information thereof. The UE having the RNTI 'A' receives a PDCCH and receives a PDSCH indicated by 'B' and 'C' through information of the received PDCCH.

FIG. 4 illustrates the structure of a UL subframe used in a 3GPP LTE(-A) system.

Referring to FIG. 4, a UL subframe may be divided into a control region and a data region in the frequency domain. One or several PUCCHs may be allocated to the control region to deliver UCI. One or several PUSCHs may be allocated to the data region of the UE subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted in a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of the PUCCH and the PUSCH may be indicated by higher layers.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarrier.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

The amount of UCI that can be transmitted by a UE in a subframe depends on the number of SC-FDMA symbols available for control information transmission. SC-FDMA symbols available for UCI correspond to SC-FDMA symbols other than SC-FDMA symbols used for reference signal transmission in a subframe. In the case of a subframe in which an SRS is configured, the last SC-FDMA symbol in the subframe is excluded from the SC-FDMA symbols available for UCI. A reference signal is used for PUCCH coherent detection. A PUCCH supports various formats according to transmitted information.

Table 3 shows a mapping relationship between PUCCH formats and UCI.

TABLE 3

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |

TABLE 3-continued

| PUCCH format | Modulation scheme | Number of bits per subframe | Usage | Etc. |
|---|---|---|---|---|
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Meanwhile, a UE detects a PDCCH carrying a UL grant therefor in subframe n and performs PUSCH transmission according to the UL grant after a predetermined number of subframes. As an example, for FDD and normal HARQ operation, if a PDCCH carrying a UL grant and/or PHICH transmission is detected in subframe #n, the UE performs corresponding PUSCH (re)transmission in SF #n+4 according to PDCCH and PHICH information. For TDD, if a PDCCH carrying a UL grant and/or PHICH transmission is detected in subframe #n, the UE may perform PUSCH (re)transmission in SF #n+$k_{PUSCH}$ according to $k_{PUSCH}$ given per TDD DL-UL configuration. The following table shows $k_{PUSCH}$ per TDD DL-UL configuration.

TABLE 4

| TDD DL-UL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Meanwhile, for PUSCH transmission scheduled in SF #n, the UE determines a corresponding PHICH resource in SF #n+$k_{PUSCH}$. For TDD, $k_{PUSCH}$ may be given as follows.

TABLE 5

| TDD UL-DL configuration | UL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In Table 5, $k_{PUSCH}$ defines a PHICH timing based on a UL subframe in which a PUSCH is transmitted. $k_{PUSCH}$ may be redefined as a new parameter (hereinafter, k) defining a PUSCH transmission timing based on a DL subframe in which a PHICH is transmitted. Table 6 shows k per TDD DL-UL configuration.

TABLE 6

| TDD DL-UL configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 7 | | | | 7 | 4 | | |
| 1 | | | 4 | | | 6 | | | 4 | 6 |
| 2 | | | | 6 | | | | 6 | | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

In Table 6, a number defined in a DL subframe per DL-UL configuration corresponds to k. For example, referring to Table 6, k of DL SF #3 in DL-UL configuration #2 is 6. For FDD, the UE receives ACK/NACK associated with PUSCH transmission in SF #i−4 on a PHICH allocated to the UE in SF #1. For TDD, the UE receives ACK/NACK associated with PUSCH transmission in SF #i−k on a PHICH allocated to the UE in SF In other words, for PUSCH transmission scheduled in SF #n, the UE determines a corresponding PHICH resource in SF #n+k.

Referring to Tables 5 and 6, DL SF #i of Table 6 corresponds to DL SF #n+$k_{PHICH}$ of Table 5 and UL SF #i−k of Table 6 corresponds to UL SF #n of Table 5.

Next, an error control method is described. In DL, a BS schedules one or more RBs to a UE selected according a determined scheduling rule and transmits data to the UE using allocated RBs. Hereinafter, scheduling information for DL transmission is referred to as DL grant and a PDCCH carrying the DL grant is referred to as a DL grant PDCCH. Hereinafter, scheduling information for UL transmission is referred to as a UL grant and a PDCCH carrying the UL grant is referred to as a UL grant PDCCH. An error control method for data transmission includes an automatic repeat request (ARQ) scheme and a hybrid ARQ (HARQ) scheme of a more evolved form. Both the ARQ scheme and the HARQ scheme waits for an ACK signal after data (e.g. a transport block or a codeword) is transmitted. A receiving device transmits the ACK signal only upon correctly receiving the data. Upon occurrence of an error in the received data, the receiving device transmits a NACK signal. A transmitting device transmits data after receiving an ACK signal. However, upon receiving the NACK signal, the transmitting device retransmits data. The ARQ scheme and the HARQ scheme are different in an error processing method during occurrence of error data. In the ARQ scheme, error data is deleted from a buffer of the receiving device and is no longer used in subsequent processes. On the other hand, in the HARQ scheme, the error data is stored in a HARQ buffer and combined with retransmission data in order to raise a reception success rate.

In a 3GPP LTE(-A) system, error control is performed using the ARQ scheme in a radio link control (RLC) layer and the HARQ scheme in a medium access control (MAC) layer/physical (PHY) layer. The HARQ scheme is categorized as synchronous HARQ and asynchronous HARQ according to retransmission timing and as channel-adaptive HARQ and channel-non-adaptive HARQ depending upon whether channel state is considered during determination of the amount of retransmission resources.

In the synchronous HARQ scheme, when initial transmission fails, retransmission is performed at a timing determined by a system. For example, if it is assumed that retransmission is performed in every X-th (e.g. X=4) time unit (e.g. a TTI or subframe) after initial transmission fails, a BS and a UE do not need to exchange information about retransmission timing. Therefore, upon receiving a NACK message, the transmitting device may retransmit corresponding data in every fourth time unit until an ACK message is received. In contrast, in the asynchronous HARQ scheme, retransmission timing is determined by new scheduling or additional signaling. That is, the retransmission timing for error data may be changed by various factors such as channel state.

In the channel-non-adaptive HARQ scheme, a modulation and coding scheme (MCS), the number of RBs, etc., which are needed for retransmission, are determined as those during initial transmission. In contrast, in the channel-adaptive HARQ scheme, the MCS, the number of RBs, etc. for retransmission are changed according to channel state. For example, in the channel-non-adaptive HARQ scheme, when initial transmission is performed using 6 RBs, retransmission is also performed using 6 RBs. In contrast, in the channel-adaptive HARQ scheme, even when initial transmission is performed using 6 RBs, retransmission may be performed using RBs less or greater in number than 6 according to channel state.

Based on such classification, a combination of the four HARQ schemes may be considered, but an asynchronous/channel-adaptive HARQ scheme and a synchronous/channel-non-adaptive HARQ scheme are mainly used. In the asynchronous/channel-adaptive HARQ scheme, the retransmission timing and the amount of retransmitted resources are adaptively changed according to channel state so as to maximize retransmission efficiency. However, since overhead is increased, this scheme is generally not considered in UL. Meanwhile, in the synchronous/channel-non-adaptive HAQR scheme, since the retransmission timing and retransmission resource allocation are determined by the system, almost no overhead occurs but retransmission efficiency is very low if this scheme is used in an environment in which the channel state is considerably changed. In current 3GPP LTE(-A), the asynchronous HARQ scheme is used in DL and the synchronous HARQ scheme is used in UL.

Figure 5:
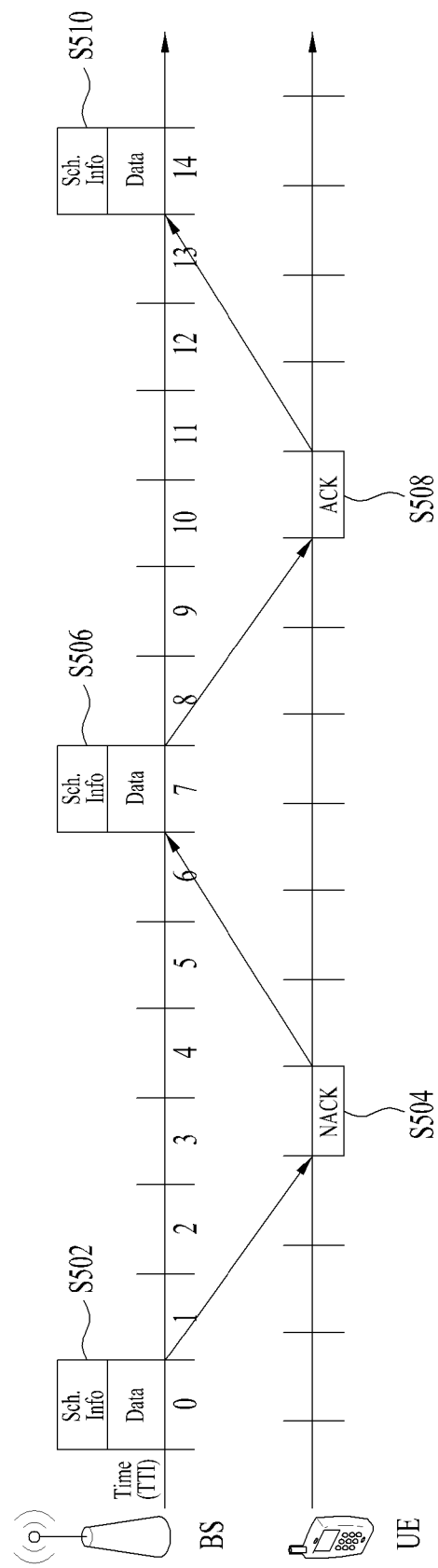
FIG. 5 illustrates a resource allocation and retransmission process of an asynchronous DL HARQ scheme.

FIG. 5 illustrates a resource allocation and retransmission process of an asynchronous DL HARQ scheme.

Referring to FIG. 5, a BS transmits scheduling information (Sch. Info)/data (e.g. a transport block or a codeword) to a UE (S502) and waits for reception of ACK/NACK from the UE. Upon receiving NACK from the UE (S504), the BS retransmits scheduling information/data to the UE (S506) and waits for reception of ACK/NACK from the UE. Upon receiving ACK from the UE (S508), a HARQ process is ended. Next, if new data transmission is needed, the BS may transmit new data and scheduling information about the new data to the UE (S510).

Meanwhile, referring to FIG. 5, a time delay occurs until the ACK/NAK is received from the UE and the retransmission data is transmitted, after the scheduling information/data is transmitted (S502). This time delay occurs due to channel propagation delay and time consumed for data decoding/encoding. Accordingly, when new data is transmitted after a current HARQ process is ended, a gap in data transmissions occurs due to the time delay. A plurality of independent HARQ processes is used for gapless data transmission during a delay period. For example, if an interval between initial transmission and retransmission is 7 subframes, data can be transmitted without a gap by performing 7 independent HARQ processes. In the plural parallel HARQ processes, UL/DL transmission is successively performed while the BS waits for reception of HARQ feedback for previous UL/DL transmission. Each HARQ process is associated with a HARQ buffer of a MAC layer. Each HARQ process manages state parameters regarding the number of transmissions of a MAC physical data unit (PDU) in a buffer, HARQ feedback for the MAC PDU in the buffer, and a current redundancy version.

Specifically, in 3GPP LTE(-A) FDD, a maximum of 8 DL HARQ processes is allocated. When carrier aggregation (CA) in which a plurality of carriers is aggregated is configured, a maximum of 8 DL HARQ processes may be allocated per carrier configured for a UE. In 3GPP LTE(-A) TDD, a maximum number of DL HARQ processes varies with UL-DL configuration. If CA is configured, a maximum number of DL HARQ processes differs per carrier configured for the UE according to TDD UL-DL configuration of a corresponding carrier. Table 7 shows a maximum number of asynchronous DL HARQ processes in TDD.

TABLE 7

| TDD UL-DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

For TDD, a maximum number of DL HARQ processes per carrier configured for the UE is determined depending upon TDD UL-DL configuration. For FDD, there may be 8 DL/UL HARQ processes per carrier configured for the UE and there may be HARQ processes corresponding to a number according to TDD UL-DL configuration per carrier configured for one UE.

In 3GPP LTE(-A) FDD, in a non-MIMO operation, 8 UL HARQ processes are allocated per carrier configured for the UE. In 3GPP LTE(-A) TDD, the number of UL HARQ processes varies with UL-DL configuration. Table 8 shows the number of synchronous UL HARQ processes in TDD.

TABLE 8

| TDD UL-DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

Figure 6:
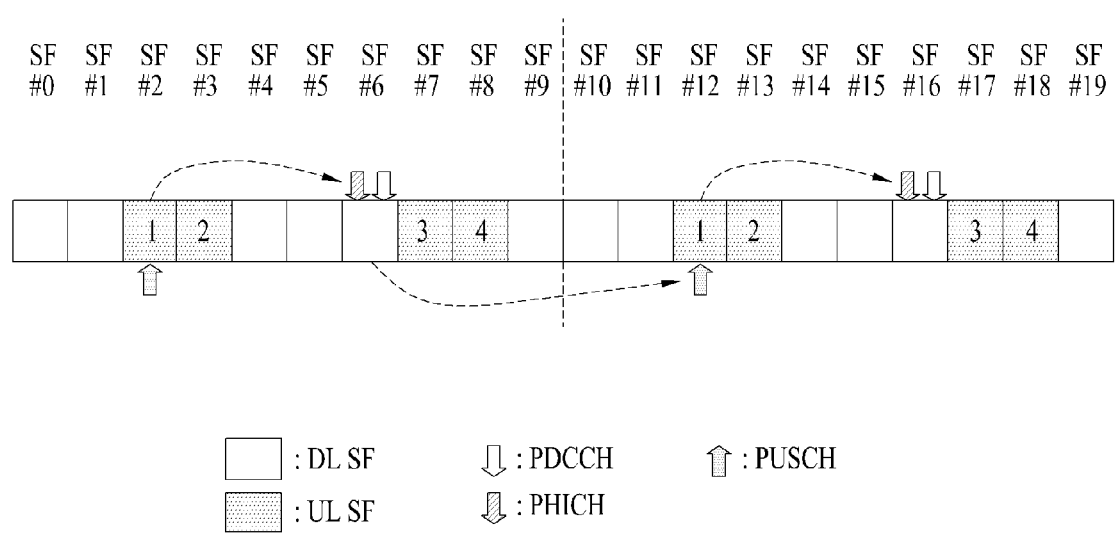
FIG. 6 illustrates a synchronous UL HARQ process in UL-DL configuration #1.

FIG. 6 illustrates a synchronous UL HARQ process in UL-DL configuration #1. In FIG. 6, a number in a box denotes a UL HARQ process number. An example of FIG. 6 illustrates a normal UL HARQ process.

Referring to FIG. 6, HARQ process #1 is associated with subframes (SFs) SF #2, SF #6, SF #12, and SF #16. For example, if an initial PUSCH signal (e.g. a redundancy version (RV)=0) is transmitted in SF #2, a UL grant PDCCH and/or a PHICH, corresponding to the PUSCH signal, may be received in SF #6 and a corresponding (retransmission) PUSCH signal (RV=2) may be transmitted in SF #12. Therefore, in UL-DL configuration #1, 4 UL HARQ processes, a round trip time (RTT) of which is 10 SFs (or 10 ms), are present.

Meanwhile, up to now, a UE according to a 3GPP LTE(-A) system monitors a PDCCH in every DL subframe. That is, according to a legacy 3GPP LTE(-A) system, a BS could transmit a PDCCH for a specific UE in an arbitrary DL subframe. However, as the amount of DL control information increases due to increase in the density of UEs serviced in a cell of a predetermined range, the number of blind decoding (BD) processes performed by a UE within a predetermined time needs also to increase. Increase in the number of BD processes performed by the UE within a predetermined time causes increase complexity of UE implementation, thereby leading to an undesirable result in that the manufacturing costs of the UE increase. In other words, in terms of the UE, a low-cost/low-end UE can be manufactured only when a wireless communication system is configured so as to detect a PDCCH of the UE by performing fewer BD processes. In addition, if more UEs operating in one cell are present, signal transmission for UL/DL scheduling/feedback always performed for each UE imparts a heavy burden upon the BS.

Accordingly, the present invention proposes a new method for reducing the number of PDCCH BD processes and handing HARQ processes, for communication between a plurality of UEs and a BS.

Hereinafter, a subframe in which a UE should perform BD for detecting a PDCCH (hereinafter, PDCCH BD) will be referred to as a PDCCH-SF and a set of a prescribed number of PDCCH-SFs will be referred to as a PDCCH-SF set. In other words, a PDCCH-SF refers to a subframe in which a BS performs PDCCH transmission to a specific UE or a subframe usable for PDCCH transmission to the specific UE. A BS according to the present invention configures one or more PDCCH-SFs in which the UE should perform PDCCH BD among SFs in a prescribed duration and provides PDCCH-SF configuration information indicating the configured PDCCH-SFs to the UE. The prescribed duration may be a predetermined fixed value or a value indicated through a radio resource control (RRC) signal by the BS to the UE. The UE performs PDCCH BD only the PDCCH-SFs configured therefor, other than all subframes, based on the PDCCH-SF configuration information and performs HARQ process(es) according to PDCCH BD. Hereinafter, methods for achieving the present invention and embodiments of the methods will be described in detail. Parameters K, L, Np, M, and N, which will be described in the following description, are positive integers and have the following meanings.

K: A minimum time interval between initial PDSCH/PUSCH transmission and PDSCH/PUSCH retransmission, expressed as the number of SFs.

L: A maximum value out of the number of PDCCH-SFs included in an SF group consisting of K arbitrary consecutive SFs.

Np: A maximum number of HARQ processes supported for the UE.

M: The number of starting PDCCH-SFs.

N: A period applied to a starting PDCCH-SF, expressed as the number of SFs.

First method: PDCCH-SF set configuration based on bitmap signaling.

The present invention proposes a method (hereinafter, a first method) in which the BS signals a PDCCH-SF pattern repeated during a prescribed duration (e.g. one or more subframe durations or one or more radio frame durations) in the form of a bitmap to the UE. That is, the bitmap indicating the PDCCH-SF pattern may be the PDCCH-SF information. In this case, the BS may further signal, to the UE, a start time point at which the PDCCH-SF bitmap pattern according to the bitmap is applied. Alternatively, it may be predefined that the bitmap is applied after a prescribed number of subframes from a subframe in which the bitmap is transmitted/received.

Figure 7:
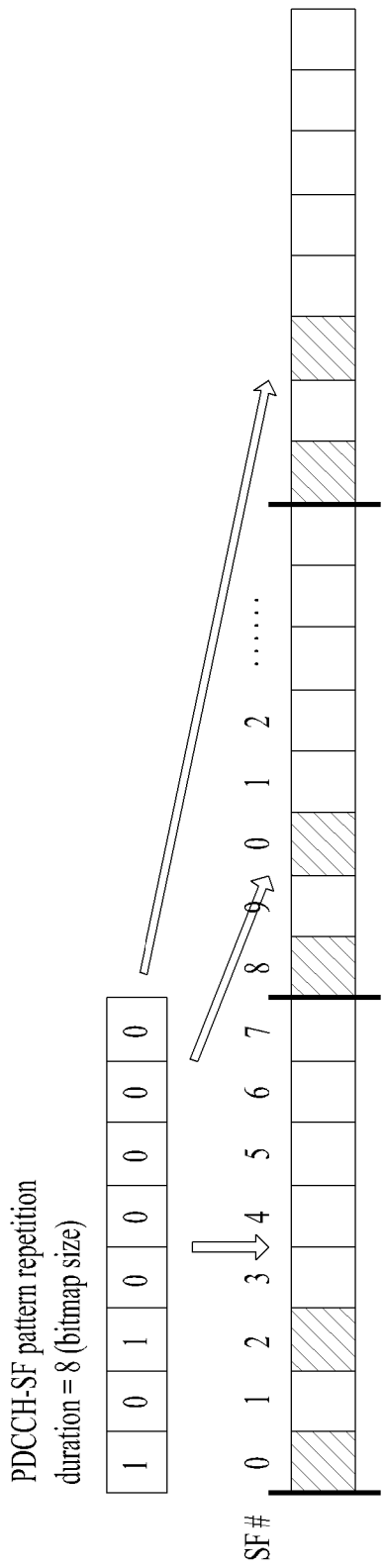
FIG. 7 illustrates blind decoding for detecting a PDCCH according to an embodiment of a first method of the present invention.

FIG. 7 illustrates BD for detecting a PDCCH according to an embodiment of a first method of the present invention.

The BS configures some SF(s) among SFs constituting a prescribed duration as PDCCH-SF(s) for a specific UE or UE group and transmits a bitmap consisting of bits corresponding one to one to the SFs constituting the prescribed duration to the specific UE or UE group. Hereinbelow, a bitmap, which consists of bits corresponding one to one to SFs in a prescribed duration and indicates the positions of PDCCH-SFs in the prescribed duration, will be referred to as a PDCCH-SF bitmap. In the PDCCH-SF bitmap, for example, bits corresponding to SFs configured as the PDCCH-SFs may be set to "1" and bits corresponding to the other SFs may be set to "0". As another example, in the PDCCH-SF bitmap, bits corresponding to SFs configured as the PDCCH-SFs may be set to "0" and bits corresponding to the other SFs may be set to "1". Hereinafter, embodiments of the present invention will be described under the assumption that bits of the PDCCH-SF bitmap are configured according to the first example.

Referring to FIG. 7, a PDCCH-SF pattern is repeated every 8 SFs. If the first and third SFs among the 8 SFs are configured as PDCCH-SFs, the BS may transmit a PDCCH-SF bitmap including 8 bits, the first and third bits of which are set to "1" and the other bits of which are set to "0", to the UE. Upon receiving the PDCCH-SF bitmap, the UE may recognize SFs corresponding to bit positions set to "1" as the PDCCH-SFs and SFs corresponding to bit positions set to "0" as SFs other than the PDCCH-SFs (hereinafter, non-PDCCH-SFs). Referring to FIG. 7 under the assumption that the bitmap starts from SF #0, the UE may recognize the first and third SFs in every 8 SFs starting from SF #0 as the PDCCH-SFs configured therefor and operate in a manner of performing PDCCH BD only in the PDCCH-SFs. In this case, the number of HARQ processes may be determined as the number of bits set to "1" in the PDCCH-SF bitmap, that is, as a total number of PDCCH-SFs within a prescribed duration. Furthermore, PDCCH-SFs repeated over a period of the duration may correspond to an independent HARQ process. For example, referring to FIG. 7, SFs having a number n when a result of applying a modulo-8 operation is 0 (i.e. SFs satisfying (SF #n) modulo 8=0 where n is a non-negative integer) correspond to one HARQ process and SFs having a number when a result of applying a modulo-8 operation is 2 (i.e. SFs satisfying (SF #n) modulo 8=0 where n is a non-negative integer) correspond to another HARQ process which is independent of the above one HARQ process.

The PDCCH-SFs may be commonly or independently configured with respect to a DL or UL (DL/UL) grant PDCCH. If the PDCCH-SFs are independently configured with respect to the DL grant PDCCH or the UL grant PDCCH, a PDCCH-SF bitmap for a DL grant and a PDCCH-SF bitmap for a UL grant may be independently transmitted to the UE and the length of the PDCCH-SF bitmap for the DL grant and the length of the PDCCH-SF bitmap for the UL grant, i.e. durations during which PDCCH-SF patterns are repeated, may be the same or different.

In this case, a maximum number of HARQ processes supported for the UE may be provided in advance to the UE from the BS through additional signaling. Alternatively, it is possible for the UE to derive the maximum number of HARQ processes supported for the UE through a received PDCCH-SF bitmap. In the second case, for example, when a minimum time interval immediately before PDSCH/PUSCH retransmission from initial PDSCH/PUSCH transmission, configured in a system, that is, an interval between initial PDSCH/PUSCH transmission and PDSCH/PUSCH retransmission, is defined as K SFs, if a maximum value of the number of PDCCH-SFs included in an SF group consisting of K consecutive SFs during application of a PDCCH-SF bitmap is L, operation of L HARQ processes may be considered. For example, in FDD, since an interval between initial PDSCH/PUSCH transmission and PDSCH/PUSCH retransmission is 8, K=8. In this case, if it is assumed that the UE receives a 40-bit PDCCH-SF bitmap, the UE may derive a maximum number of HARQ processes by counting the number of bits set to 1 among 8 arbitrary consecutive bits among 40 bits constituting the PDCCH-SF bitmap. If a maximum number of bits set to 1 as a result of counting in 8 arbitrary consecutive bits is 2, L=2 and the UE may determine a maximum number of HARQ processes as 2. When considering continuity of each HARQ process and characteristics of a UL HARQ process, if a common PDCCH-SF bitmap is configured with respect to a DL/UL grant PDCCH, a maximum interval between PDCCH-SFs in the PDCCH-SF bitmap may be set to a value less than K and a duration during which the PDCCH-SF pattern is repeated may be set to a multiple of K and/or a multiple of SFs constituting one radio frame.

Figure 8:
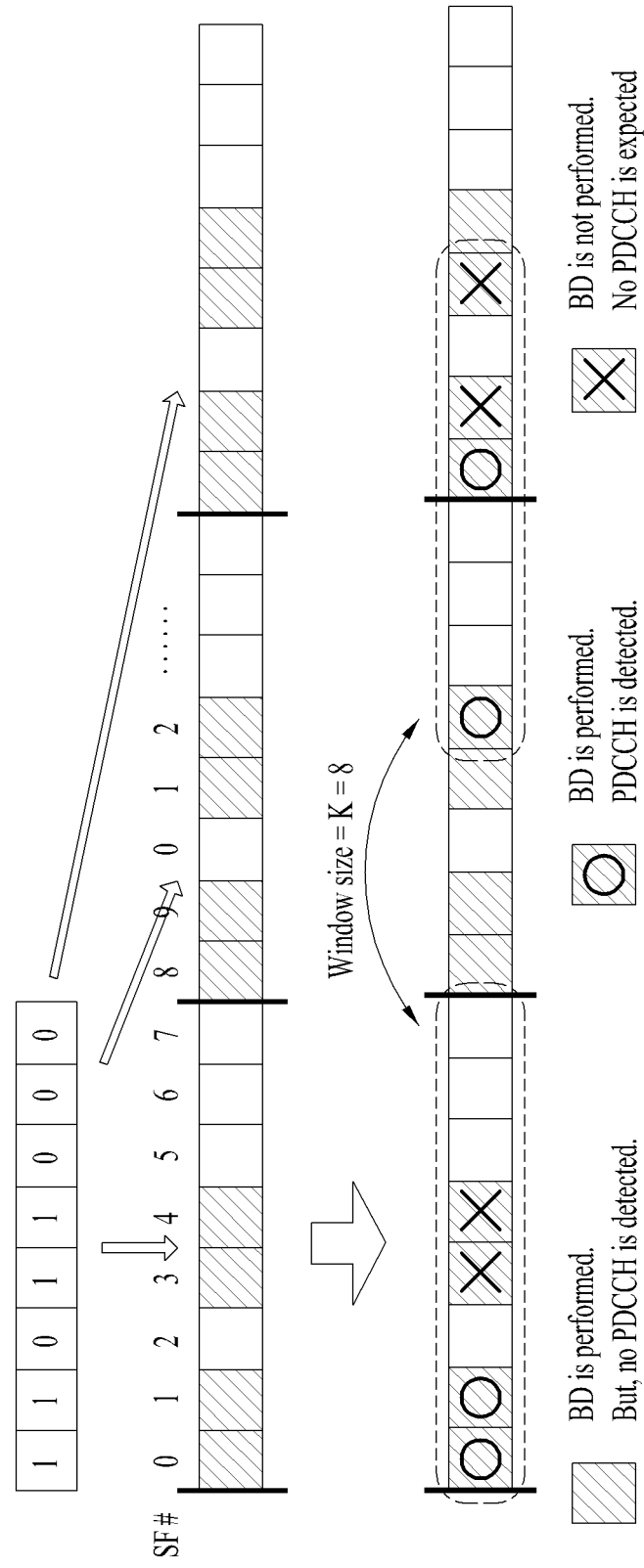
FIG. 8 illustrates blind decoding for detecting a PDCCH according to another embodiment of the first method of the present invention.

FIG. 8 illustrates BD for detecting a PDCCH according to another embodiment of the first method of the present invention.

A maximum number of HARQ processes (hereinafter, Np) supported for the UE may use a value less than L. The maximum number Np of HARQ processes supported for the UE may use a fixed value (e.g. 1) or may be pre-signaled to the UE by the BS through an RRC signal. If L is less than Np, PDCCH-SFs indicated by a PDCCH-SF bitmap may be defined as SFs in which PDCCHs are likely to be transmitted. If a total number of SFs in which PDCCHs have been detected becomes Np in an SF group consisting of K arbitrary consecutive SFs starting from an SF in which a PDCCH has been detected, BD for PDCCH detection may be omitted with respect to PDCCH-SF(s) of the SF group which is are present after the PDCCH-SF in which the last PDCCH has been detected in the SF group. That is, the SF group corresponds to a window, the size of which is K starting from an SF in which a PDCCH is detected.

According to this embodiment, even if the number of HARQ processes which can be used by the BS is L, the BS may use only Np HARQ processes less than L HARQ processes with respect to a specific UE. Among K SFs between PDSCH/PUSCH transmission and PDSCH/PUSCH retransmission, PDCCHs may be transmitted only in Np SFs. When L equals Np, if no PDCCH is transmitted in the K SFs, the BS should wait until the next period to perform scheduling. In contrast, if Np is less than L, since the BS has additional (L−Np) scheduling opportunities, the present invention has an effect of raising scheduling freedom.

In this embodiment, the K value may be signaled in advance through an RRC signal from the BS to the UE as a value other than a minimum time interval between initial PDSCH/PUSCH transmission and PDSCH/PUSCH retransmission (preferably, as a value larger than the minimum time interval between initial PDSCH/PUSCH transmission and PDSCH/PUSCH retransmission).

Figure 9:
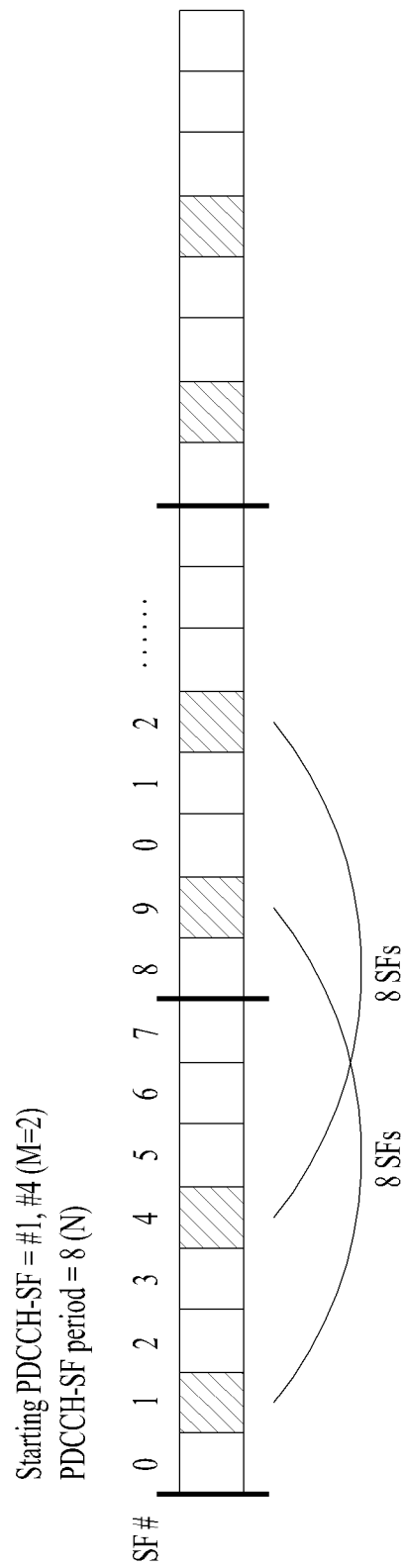
FIG. 9 illustrates blind decoding for detecting a PDCCH according to an embodiment of a second method of the present invention.

Second method: PDCCH-SF set configuration with multiple starting PDCCH-SFs and a single period FIG. 9 illustrates blind decoding for detecting a PDCCH according to an embodiment of a second method of the present invention.

The present invention proposes a method (hereinafter, a second method) for signaling information about M starting PDCCH-SFs and information about one period N commonly applied to the M starting PDCCH-SFs (hereinafter, a PDCCH-SF period). A subframe index/number and/or a radio frame index/number may be used as the start PDCCH-SF information. That is, the starting PDCCH-SF information and the PDCCH-SF period information may be PDCCH-SF configuration information. The BS of the present invention may further signal a start time point at which the M starting PDCCH-SFs are applied to the UE. Alternatively, it may be predefined that the PDCCH-SF configuration information is applied after a prescribed number of subframes from a subframe in which the PDCCH-SF configuration information is transmitted/received. Hereinafter, N SFs including one starting PDCCH-SF will be referred to as one PDCCH-SF set. If M starting PDCCH-SFs are configured, this may be interpreted as configuration of M PDCCH-SF sets. Each of the M PDCCH-SF sets may correspond to an independent HARQ process.

The UE may recognize SFs, repeated over a period of N SFs, starting from each of the M starting PDCCH-SFs as PDCCH-SFs and recognize the other SFs as non-PDCCH-SFs. In other words, the UE may operate in a manner of recognizing an N-th SF after each starting PDCCH-SF as a PDCCH-SF and performing PDCCH BD only in the PDCCH-SF. Referring to FIG. 9, for example, if it is assumed that the starting PDCCH-SF is applied beginning from SF #0, the BS may configure SF #1 and SF #4 as starting PDCCH-SFs, configure a period commonly applied to the starting PDCCH-SFs as 8 (i.e. N=8), and transmit starting PDCCH-SF information indicating the configured starting PDCCH-SFs and period information indicating the period to a corresponding UE. 8 SFs including SF #1 form one PDCCH-SF set, 8 SFs including SF #4 forms another PDCCH-SF set, and these two PDCCH-SF sets may correspond to two independent HARQ processes. The UE may receive the starting PDCCH-SF information and the period information and recognize SF #1 and SF #4 as the starting PDCCH-SFs based on the starting PDCCH-SF information and the period information. The UE may recognize SF #1 and SFs corresponding to multiples of 8 after SF #1 as starting PDCCH-SFs of a HARQ process corresponding to SF #1. The UE may recognize SF #4 and SFs corresponding to multiples of 8 after SF #4 as starting PDCCH-SFs of a HARQ process corresponding to SF #4 and recognize the other SFs as non-PDCCH-SFs. That is, the UE recognizes SFs corresponding to SF #(1+8*m) and SF #(4+8*m) (where m is a non-negative integer) as PDCCH-SFs so that PDCCH BD may be performed in the corresponding SFs and PDCCH BD may not be performed in the other SFs.

In this embodiment, a common or independent (starting PDCCH-SFs and PDCCH-SF period) combination may be configured with respect to a DL grant PDCCH and a UL grant PDCCH. If a (starting PDCCH-SFs and PDCCH-SF period) combination for the DL grant PDCCH and a (starting PDCCH-SFs and PDCCH-SF period) combination for the UL grant PDCCH are independently configured, the number of starting PDCCH-SFs and/or a PDCCH-SF period for the DL grant, and the number of starting PDCCH-SFs and/or a PDCCH-SF period for the UL grant may be the same or different.

In DL, when considering that DL grant based asynchronous retransmission can be performed, the PDCCH-SF period N may be set to a value (e.g. K, K+1, K+2, . . . ) equal to or greater than K. In UL, since synchronous retransmission can be automatically performed even without an additional UL grant, N may be set to a multiple of K (e.g. K, 2K, 3K, . . . ). In consideration of continuity of each HARQ process and characteristics of a UL HARQ process, if the common (starting PDCCH-SFs and PDCCH-SF period) combination is configured with respect to the DL grant PDCCH and the UL grant PDCCH, a maximum interval between the starting PDCCH-SFs may be set to a value less than K and N may be set to a multiple of K.

In this embodiment, a maximum number $N_p$ of HARQ processes supported for the UE may be signaled by the BS to the UE through additional signaling. Alternatively, it is possible to perform the same number of HARQ processes identical to the number of the starting PDCCH-SFs. Alternatively, if a maximum number of PDCCH-SFs included in an SF group consisting of K arbitrary consecutive SFs is L when a combination of received starting PDCCH-SFs and a PDCCH-SF period is applied, L HARQ processes may be performed.

Meanwhile, the maximum number $N_p$ of HARQ processes supported for the UE may be a value less than M. In this case, a fixed value less than M may be used as $N_p$ or a pre-signaled value to the UE from the BS through an RRC signal may be used as $N_p$. If the maximum number $N_p$ of HARQ processes is less than the number M of starting PDCCH-SFs, the PDCCH-SFs may be defined as SFs in which PDCCHs are likely to be transmitted. If a total number of SFs in which PDCCHs have been detected becomes $N_p$ in an SF group consisting of K arbitrary consecutive SFs starting from an SF in which a PDCCH has been detected, BD for PDCCH detection may be omitted with respect to PDCCH-SF(s) of the SF group which is/are present after the SF in which the last PDCCH has been detected in the SF group.

In this embodiment, the K value may be signaled in advance through an RRC signal from the BS to the UE as a value other than a minimum time interval between initial PDSCH/PUSCH transmission and PDSCH/PUSCH retransmission (preferably, as a value larger than the minimum time interval between initial PDSCH/PUSCH transmission and PDSCH/PUSCH retransmission).

Figure 10:
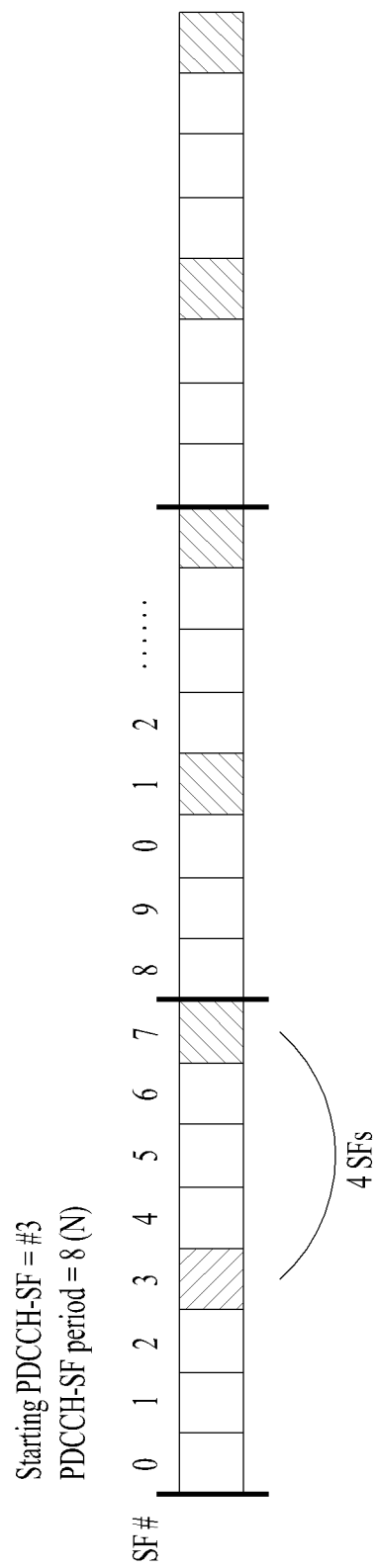
FIG. 10 illustrates blind decoding for detecting a PDCCH according to another embodiment of the second method of the present invention.

FIG. 10 illustrates blind decoding for detecting a PDCCH according to another embodiment of the second method of the present invention.

As another embodiment of the second method of the present invention, information about one starting PDCCH-SF (e.g. an SF index or SF number) and information about one period N applied to the one PDCCH-SF are signaled. That is, the starting PDCCH-SF information and the PDCCH-SF period information may be PDCCH-SF configuration information. In this method, the BS may further signal, to the UE, a start time point at which the starting PDCCH-SF is applied. Alternatively, it may be predefined to apply the PDCCH-SF configuration information after a prescribed number of SFs from an SF in which the PDCCH-SF configuration is transmitted/received. Similarly to the embodiment of FIG. 9, in this embodiment, one or more PDCCH-SFs may be configured in K SFs. Notably, in FIG. 9, all starting PDCCH-SFs of PDCCH-SFs configured over a period of K SFs are configured and one or more PDCCH-SFs are configured in K SFs by setting N to be greater than or equal to K. In this embodiment, however, one or more PDCCH-SFs may be configured in the K SFs by setting N to be less than K so that.

The UE may recognize SFs, repeated over a period of N consecutive SFs, starting from a corresponding starting PDCCH-SF as PDCCH-SFs and recognize the other SFs as non-PDCCH-SFs. The UE may operate in a manner of performing PDCCH BD only in the PDCCH-SFs. Referring to FIG. 10, for example, if it is assumed that the starting PDCCH-SF is applied beginning from SF #0, the BS may configure SF #3 as a starting PDCCH-SF, configure a period applied to the starting PDCCH-SF as 4 (i.e. N=4), and transmit starting PDCCH-SF information indicating the configured starting PDCCH-SF and period information indicating the period to a corresponding UE. In this case, the UE may recognize SF #3 and SFs corresponding to multiples of 4 after SF #3 as PDCCH-SFs in which PDCCH BD is to be performed. That is, the UE recognizes SFs corresponding to SF #(3+4*m) (where m is a non-negative integer) as PDCCH-SFs so that PDCCH BD may be performed in the corresponding SFs and PDCCH BD may not be performed in the other SFs.

In this embodiment, a common or independent (starting PDCCH-SF and PDCCH-SF period) combination may be configured with respect to a DL grant PDCCH and a UL grant PDCCH.

In DL, when considering that DL grant based asynchronous retransmission can be performed, the PDCCH-SF period N may be set without any particular restrictions. On the other hand, in UL, since synchronous retransmission can be automatically performed even without an additional UL grant, N may be set to a submultiple or multiple of K (e.g. K/2, K, 2K, . . . ). In consideration of continuity of each HARQ process and characteristics of a UL HARQ process, if the common (starting PDCCH-SF and PDCCH-SF period) combination is configured with respect to the DL grant PDCCH and the UL grant PDCCH, N may be set to a submultiple or multiple of K.

In this embodiment, a maximum number Np of HARQ processes supported for the UE may be pre-signaled by the BS to the UE through additional signaling. Alternatively, it is possible to perform the same number of HARQ processes identical to the number of the starting PDCCH-SFs. Alternatively, if a maximum number of PDCCH-SFs included in an SF group consisting of K arbitrary consecutive SFs is L when a combination of received starting PDCCH-SF and a PDCCH-SF period is applied, L HARQ processes may be performed.

Meanwhile, the maximum number Np of HARQ processes supported for the UE may be a value less than L. In this case, a fixed value less than L may be used as Np or a value (<L) signaled to the UE by the BS through an RRC signal may be used as Np. If the maximum number Np of HARQ processes is less than the number L of starting PDCCH-SFs, the PDCCH-SFs may be defined as SFs in which PDCCHs are likely to be transmitted. If a total number of SFs in which PDCCHs have been detected becomes Np in an SF group consisting of K arbitrary consecutive SFs starting from an SF in which a PDCCH has been detected, BD for PDCCH detection may be omitted with respect to PDCCH-SF(s) of the SF group which is/are present after the SF in which the last PDCCH has been detected in the SF group. At this time, K may be signaled in advance through an RRC signal by the BS to the UE as a value other than a minimum time interval between initial PDSCH/PUSCH transmission and PDSCH/PUSCH retransmission (preferably, as a value larger than the minimum time interval between initial PDSCH/PUSCH transmission and PDSCH/PUSCH retransmission).

In the above-described embodiments of the present invention, in a state that SFs in which PDCCHs are likely to be transmitted and the maximum number Np of HARQ processes are determined, if a total number of PDCCH-SFs in which PDCCHs have been detected becomes Np in an SF group consisting of K arbitrary consecutive SFs starting from an SF in which a PDCCH has been detected, the UE may omit BD for PDCCH detection with respect to PDCCH-SF(s) of the SF group which is/are present after the PDCCH-SF in which the last PDCCH has been detected in the SF group.

Figure 11:
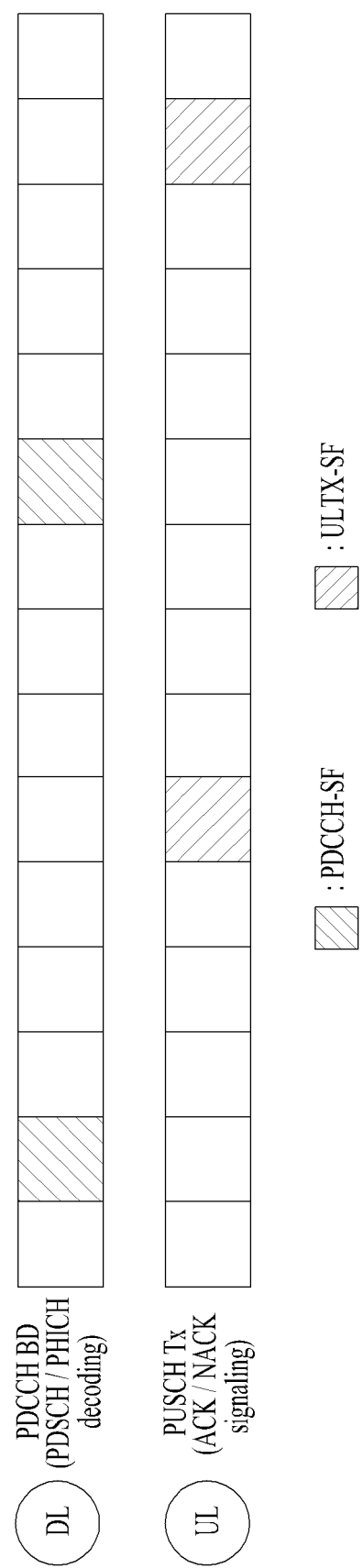
FIG. 11 illustrates PUSCH transmission and an ACK/NACK transmission process for DL data according to the present invention.

FIG. 11 illustrates PUSCH transmission and an ACK/NACK transmission process for DL data according to the present invention. In FIG. 11, it is assumed that L=1 and N=K=8 and it is also assumed that $k_{PUSCH}$, which is an interval between an SF in which a UL grant PDCCH is transmitted and an SF in which a PUSCH according to a corresponding UL grant is transmitted is 4.

Referring to FIG. 11, a UE according to an embodiment of the present invention performs BD for detecting a DL/UL grant PDCCH over a period of 8 SFs only in PDCCH-SFs and perform PDSCH decoding and PHICH detection over a period of 8 SFs only in the PDCCH-SFs. The UE according to an embodiment of the present invention may perform PUSCH transmission and ACK/NACK transmission for DL data over a period of 8 SFs only in an SF set (hereinafter, a ULTX-SF set) in which an offset of 4 SFs (i.e. $k_{PUSCH}$=4) is applied to the PDCCH-SFs. The UE according to an embodiment of the present invention may not perform operations related to a DL/UL HARQ process including BD for a PDCCH in SFs other than the PDCCH-SFs and ULTX-SFs and this leads to transmission/reception power saving of the UE.

The above-described embodiments may be commonly applied to a DL grant PDCCH and a UL grant PDCCH. If any one of the embodiments of the first method using the PDCCH-SF bitmap and the embodiments of the second method configuring a combination (of the starting PDCCH-SF and the PDCCH-SF period) is commonly applied to the DL grant PDCCH and the UL grant PDCCH, the DL grant and the UL grant may be transmitted using DCI formats (e.g. format 0/1A) for a DL/UL grant PDCCH having the same size. Thus the number of SFs in which the UE performs BD can be reduced. At this time, if a time interval between DL grant transmission and ACK/NACK signal transmission is equal to a time interval between UL grant transmission and PUSCH transmission (e.g. refer to FIG. 11), since an ACK/NACK transmission timing for a DL HARQ process related to a corresponding PDCCH-SF is always identical to a timing (i.e. ULTX-SF) at which a PUSCH can be transmitted, ACK/NACK may be multiplexed/piggybacked on a PUSCH as well as a PUCCH and then transmitted from the UE to the BS. That is, if any one of the embodiments of the present invention is commonly applied to the DL grant and the UL grant, DCI formats having the same size are used for the DL grant and the UL grant, and a time interval between DL grant transmission and an ACK/NACK signal transmission is the same as a time interval between UL grant transmission and PUSCH transmission, transmit power need not be consumed for ACK/NACK transmission and PUSCH transmission in different SFs and thus a probability of reducing transmit power of the UE increases. For transmission/reception power saving, the UE may not perform operations related to PDCCH BD and a DL/UL HARQ process in SFs other than the PDCCH-SFs and ULTX-SFs.

Meanwhile, in a TDD system, it may be more effective in terms of power saving to configure a PDCCH-SF set with respect to all or some of SFs (hereinafter, DUP-SFs) in which DL/UL grant PDCCHs can be simultaneously detected and to perform PDCCH BD only in the corresponding set. For power saving, the UE may actually perform PDCCH BD only in SFs which are DUP SFs among PDCCH-SFs configured according to the afore-described embodiments of the present invention and operate in a manner of omitting BD in PDCCH-SF(s) other than the DUP-SFs. In addition, the first and second methods may be applied only to the DUP SFs. For example, referring to TDD DL-UL configuration 2 of Tables 1 and 4, in a radio frame according to TDD DL-UL configuration 2, the UE may receive a PDCCH for a UL grant only in SF #3 and SF #8. Since SF #3 and SF #8 correspond to DL SFs and a PDCCH for a DL grant may be configured in an arbitrary DL SF, SF #3 and SF #8 according to TDD DL-UL configuration 2 correspond to DUP-SFs. The BS may perform PDCCH transmission for a specific UE only in SF #3 and SF #8, which are the DUP-SFs, and the specific UE may operate to perform BD for detecting a UL/DL grant PDCCH only in SF #3 and SF #8 of the DUP-SFs. In TDD, the BS may signal, to the UE, PDCCH-SF numbers in a duration P (e.g. referring to Table 2, P=10 [SFs]) during which DL/UL SF configuration is repeated in the form of a bitmap (in the case of the first method) or in a direct way (in the case of the second method). Even in this case, SFs configured as PDCCH-SFs may be limited only to the DUP-SFs. In the first method, the bitmap may be configured only by bits corresponding one to one to the DUP-SFs and then the PDCCH-SFs may be designated using the bitmap.

In a channel environment in which DL traffic load and UL traffic load have an asymmetric characteristic, a maximum number of HARQ processes, which is signaled in advance or derived through the above-described embodiments and other methods, may be determined to be different in DL and UL. Any one of the number of UL HARQ processes and the number of DL HARQ processes may use a pre-fixed value (e.g. 1) and the other may use a previously signaled value or a value derived through the above embodiments and other methods.

In the above-described embodiments of the present invention, the BS may arrange PDCCH-SFs continuously or discontinuously within a prescribed duration. Notably, if the PDCCH-SFs are discontinuously arranged, the UE may be implemented to have a low decoding speed relative to the case in which the PDCCH-SFs are continuously configured. For example, if the BS configures every even-numbered SF as PDCCH-SFs and every odd-numbered SF as non-PDCCH-SFs, since the UE only needs to end decoding of a PDCCH transmitted in an even-numbered SF only before the next even-number SF, a decoding speed necessary for the UE is reduced in half relative to the case in which PDCCH detection is performed in every SF. This means that the speed of a processor can be lowered in implementing the UE. Since the speed of the processor has a close relationship with manufacturing costs of the UE, reduction in the speed of decoding performed by the UE may result in reduction in the manufacturing costs of the UE. To enable communication between the BS and the UE having a low decoding speed, the BS and the UE may previously exchange conditions about continuity of PDCCH-SFs. For instance, the fact that two SFs cannot be successively configured as PDCCH-SFs with respect to a UE belonging to a specific category (e.g. a machine type communication (MTC) UE) may be predefined in a wireless communication system and the UE may report whether itself belongs to the category to the BS at the first access time point to a network of the UE or to the BS.

In the above-described embodiments of the present invention, a UE operation (e.g. PDCCH-BD) in a PDCCH-SF may be limitedly applied only in a UE-specific SS of a corresponding UE. Some SFs (e.g. SFs having a special purpose such as a multimedia broadcast single frequency network (MBSFN) SF) among allocated PDCCH-SFs may be excluded from SFs for actual PDCCH detection or PDCCH detection may be performed for other purposes even in some SFs (e.g. SFs for a system information block (SIB) or paging transmission/reception) except for the allocated PDCCH-SFs.

Figure 12:
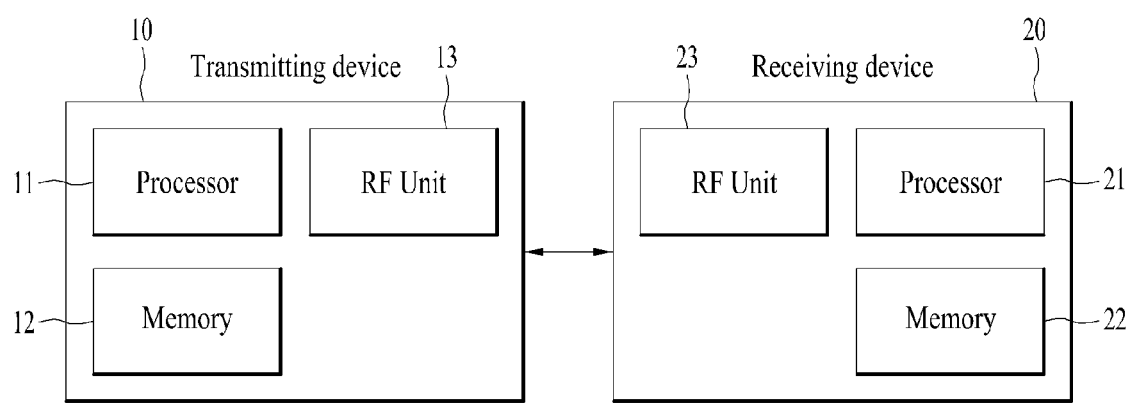
(FIG. 12 is a block diagram illustrating elements of a transmitting device 10 and a receiver 20 for implementing the present invention).

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 codes and modulates signals and/or data scheduled by the processor 11 or a scheduler connected to the processor 11 to be transmitted to the exterior. The coded and modulated signals and/or data are transmitted to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23, according to an embodiment of the present invention, under control of the processors 11 and 21. The antenna may also be called an antenna port. Each antenna may correspond to one physical antenna or may be configured by a combination of more than one physical antenna element. A signal transmitted through each antenna cannot be decomposed by the receiving device 20. An RS transmitted through a corresponding antenna defines an antenna viewed from the receiving device 20 and enables the receiving device 20 to perform channel estimation for the antenna, irrespective of whether a channel is a single radio channel from one physical antenna or a composite channel from a plurality of physical antenna elements including the antenna. That is, an antenna is defined such that a channel for transmitting a symbol on the antenna can be derived from the channel through which another symbol on the same antenna is transmitted. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, a BS operates as the receiving device 20 in UL and as the transmitting device 10 in DL. Hereinafter, the processor, RF unit, and memory included in the UE will be referred to as a UE processor, a UE RF unit, and a UE memory, respectively, and the processor, RF unit, and memory unit included in the BS will be referred to as a BS processor, a BS RF unit, and a BS memory, respectively.

According to the embodiments of the present invention, the BS processor controls the BS RF unit to transmit a PDCCH, a PDSCH, and a PHICH and the UE processor controls the UE RF unit to receive the PDCCH, the PDSCH, and the PHICH. According to the embodiments of the present invention, the UE processor controls the UE RF unit to transmit a PUCCH and a PUSCH and the BS processor controls the BS RF unit to receive the PUCCH and the PUSCH.

The BS processor of the present invention may configure one or more PDCCH-SFs in which the UE should perform PDCCH BD among SFs in a prescribed duration and control the BS RF unit to transmit PDCCH-SF information indicating the configured PDCCH-SFs to the UE according to any one of the embodiments of the present invention. The prescribed duration may be a predetermined fixed value or may be a value configured by the BS processor to be transmitted to the UE by the BS RF unit. The UE processor of the present invention is configured to perform PDCCH BD only in PDCCH-SFs configured therefor rather than in all SFs and perform HARQ process(es) according to DCI detected through PDCCH BD.

The BS processor may control the BS RF unit to transmit a bitmap having a length corresponding to the duration as the PDCCH-SF information to the UE according to the first method. The BS processor may control the BS RF unit to further transmit information indicating a start time at which the bitmap is applied to the UE. The BS processor may control the BS RF unit to transmit information about M starting PDCCH-SFs in the prescribed duration and a period N applied to the M starting PDCCH-SFs to the UE as the PDCCH-SF information according to the second method of the present invention. Alternatively, the BS processor may control the BS RF unit to transmit information about one starting PDCCH-SF in the prescribed duration and a period of the starting PDCCH-SF to the UE as the PDCCH-SF information. If the decoding speed of the UE is slow, the BS processor may discontinuously configure the PDCCH-SFs. The BS processor may allocate a PDCCH carrying DCI for the UE only in SFs configured as the PDCCH-SFs for the UE among a plurality of SFs in the prescribed duration. The BS processor may perform a HARQ process only in SFs configured as the PDCCH-SFs for the UE and may not perform operations related to the HARQ process in non-PDCCH-SFs. The BS processor may allocate a PDCCH of the UE in SFs configured as the PDCCH-SFs over a period of the prescribed duration until a new PDCCH-SF pattern is configured. In TDD, the BS processor may configure all or some of DUP-SFs as the PDCCH-SFs for the UE.

The UE processor may control the UE RF unit to receive the PDCCH-SF information indicating the configured PDCCH-SFs and recognize one or more PDCCH-SFs configured for the UE based on the PDCCH-SF information. The UE processor attempts to decode a PDCCH only in SFs configured as the PDCCH-SFs among a plurality of SFs in the prescribed duration and performs a DL/UL HARQ process only in SFs configured as the PDCCH-SFs. The UE processor may not attempt to decode the PDCCH in non-PDCCH-SFs among a plurality of SFs in the prescribed duration and may not perform operations related to the HARQ process in the non-PDCCH-SFs. The UE processor may perform PDCCH decoding and a HARQ process only in the PDCCH-SFs according to the PDCCH-SF information every period of the prescribed duration until new PDCCH-SF information is configured and may not perform the PDCCH decoding and HARQ process in the other SFs. In TDD, the UE processor may determine all or some of the DUP-SFs as the PDCCH-SFs for the UE. Alternatively, the UE processor may be configured to perform the PDCCH decoding and HARQ process in SFs corresponding to the DUP-SFs among PDCCH-SFs indicated by the PDCCH-SF information.

When a maximum number L of HARQ processes usable by the BS is greater than the number Np of HARQ processes actually supported for the UE, if the number of PDCCH-SFs in which PDCCHs have successfully been decoded becomes Np in an SF group consisting of K consecutive SFs, the UE processor may be configured to omit PDCCH decoding with respect to PDCCH-SF(s) of the SF group which is/are present after an SF in which the last PDCCH has successfully been decoded in the SF group. In other words, the UE processor may not perform BD in SF(s) after an SF in which Np-th PDCCH detection has successfully performed in the SF group.

If the UE exhibits low-speed decoding performance, the UE processor may control the UE RF unit to transmit information indicating the performance to the BS.

According to the afore-described embodiments of the present invention, the number of BD processes that should be performed by each UE can be reduced and the number of HARQ processes configured for each UE can also be reduced. Accordingly, the embodiments of the present invention are especially useful for communication between a plurality of UEs positioned in a predetermined cell and a BS managing the predetermined cell, in that signaling overhead between the UEs and the BS is reduced and/or UL implementation complexity decreases. For example, the present invention may be applied to MTC, which is one important standardization issue discussed recently. MTC refers to information exchange performed between a machine and a BS without involving persons. MTC may be used for data communication of measurement/sensing/reporting such as meter reading, water level measurement, use of a surveillance camera, inventory reporting of a vending machine, etc. A UE used for MTC is referred to as an MTC device or an MTC UE. In MTC, less transmission data and a large number of UEs operating per cell are expected. Accordingly, in the case in which the MTC UE should perform only specific simple functions relative to a normal UE, if the embodiments of the present invention having effects of reduction in UE complexity and efficient management of HARQ processes are applied to the MTC UE, it is possible to achieve a low-cost/low-end MTC UE. For example, the embodiments of the present invention can be applied to perform BD for detecting a DL/UL grant PDCCH only in a PDCCH-SF set, which is a specific SF set predesignated through RRC signaling.

According to the embodiments of the present invention, DL/UL transmission between a plurality of UEs and a BS can be scheduled by a PDCCH efficiently and with low complexity.

The detailed description of the preferred embodiments of the present invention has been given hereinabove to enable those skilled in the art to implement and practice the invention. Although the invention has been described with reference to exemplary embodiments, those skilled in the art will appreciate that various modifications and variations can be made in the present invention without departing from the spirit and scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable a BS, a relay, a UE, or other devices in a wireless communication system.

The invention claimed is:

1. A method for receiving a downlink signal from a base station by a user equipment in a wireless communication system, comprising:
   receiving first information and second information from the base station, the first information indicating L subframes (where L is a positive integer) available for transmission of a downlink control signal for the user equipment among a plurality of subframes corresponding to a prescribed duration and the second information indicating a maximum number Np of hybrid automatic repeat request (HARQ) processes (where Np is a positive integer not greater than L) supported for the user equipment; and
   performing blind decoding for detecting the downlink control signal only in the L subframes indicated by the first information among the plurality of subframes,
   wherein, if the number of subframes in which the downlink control signal is detected becomes Np in a subframe group consisting of K consecutive subframes (where K is a positive integer greater than L) starting from a subframe in which the downlink control signal is detected, the blind decoding is omitted in a remaining subframe of the subframe group.

2. The method according to claim 1, wherein K is the number of subframes corresponding to an interval between initial transmission of downlink data and retransmission of the downlink data.

3. The method according to claim 1, wherein the first information includes a bitmap consisting of a plurality of bits corresponding one to one to the plurality of subframes corresponding to the prescribed duration or includes information indicating a start subframe and a period of the start subframe.

4. The method according to claim 3, wherein, if the first information includes the bitmap, a subframe corresponding to a bit set to a first value among the plurality of bits is a subframe available for transmission of the downlink control signal and a subframe corresponding to a bit set to a second value among the plurality of bits is a subframe other than the subframe available for transmission of the downlink control signal.

5. The method according to claim 1, wherein a HARQ process is performed only in the L subframes indicated by the first information among the plurality of subframes.

6. The method according to claim 1, further comprising:
   if the user equipment is a prescribed user equipment that is incapable of performing blind decoding in consecutive subframes, transmitting information indicating that the user equipment is the prescribed user equipment to the base station.

7. A user equipment for receiving a downlink signal from a base station in a wireless communication system, comprising:
   a radio frequency (RF) unit configured to transmit/receive a signal; and
   a processor configured to control the RF unit,
   wherein the processor controls the RF unit to receive first information and second information from the base station, the first information indicating L subframes (where L is a positive integer) available for transmission of a downlink control signal for the user equipment among a plurality of subframes corresponding to a prescribed duration and the second information indicating a maximum number Np of hybrid automatic repeat request (HARQ) processes (where Np is a positive integer not greater than L) supported for the user equipment, and performs blind decoding for detecting the downlink control signal only in the L subframes indicated by the first information among the plurality of subframes, and
   wherein, if the number of subframes in which the downlink control signal is detected becomes Np in a subframe group consisting of K consecutive subframes (where K is a positive integer greater than L) starting from a subframe in which the downlink control signal is detected, the blind decoding is omitted in a remaining subframe of the subframe group.

8. The user equipment according to claim 7, wherein K is the number of subframes corresponding to an interval between initial transmission of downlink data and retransmission of the downlink data.

9. The user equipment according to claim 7, wherein the first information includes a bitmap consisting of a plurality of bits corresponding one to one to the plurality of subframes corresponding to the prescribed duration or includes information indicating a start subframe and a period of the start subframe.

10. The user equipment according to claim 9, wherein, if the first information includes the bitmap, the processor is configured to determine a subframe corresponding to a bit set to a first value among the plurality of bits as a subframe available for transmission of the downlink control signal and determine a subframe corresponding to a bit set to a second value among the plurality of bits as a subframe other than the subframe available for transmission of the downlink control signal.

11. The user equipment according to claim 7, wherein the processor is configured to perform a HARQ process only in the L subframes indicated by the first information among the plurality of subframes.

12. The user equipment according to claim 7, wherein, if the user equipment is a prescribed user equipment that is incapable of performing blind decoding in consecutive subframes, the processor is configured to transmit information indicating that the user equipment is the prescribed user equipment to the base station.

\* \* \* \* \*